United States Patent
Reyhing et al.

[11] 3,808,773
[45] May 7, 1974

[54] PROCESS AND APPARATUS FOR THE ADSORPTIVE PURIFICATION OF GASES

[75] Inventors: Jorg Reyhing; Wilhelm Rohde, both of Munich, Germany

[73] Assignee: Linde Aktiengesellschaft, Wiesbaden, Germany

[22] Filed: Dec. 28, 1971

[21] Appl. No.: 213,051

[30] Foreign Application Priority Data
Dec. 28, 1970   Germany............................ 2064137

[52] U.S. Cl............................. 55/31, 55/33, 55/68, 55/70, 55/73, 55/75
[51] Int. Cl............................................. B01d 53/02
[58] Field of Search............... 55/31, 33, 68, 70, 71, 55/73, 75, 163, 180

[56] References Cited
UNITED STATES PATENTS

| | | | |
|---|---|---|---|
| 1,948,779 | 2/1934 | Abbott et al.................... | 55/33 X |
| 3,359,706 | 12/1967 | Zankey............................ | 55/33 X |
| 3,078,634 | 2/1963 | Milton............................. | 55/33 |
| 3,513,631 | 5/1970 | Seibeat et al.................... | 55/33 |
| 3,359,707 | 12/1967 | Dean................................ | 55/75 X |
| 3,078,638 | 2/1963 | Milton............................. | 55/68 |
| 3,533,221 | 10/1970 | Tamura........................... | 55/33 |
| 3,517,484 | 6/1970 | Lee.................................. | 55/75 X |

*Primary Examiner*—John Adee
*Attorney, Agent, or Firm*—Millen, Raptes & White

[57] ABSTRACT

A method for the adsorptive purification of gases containing water and one or more secondary components which comprises passing the gas through a molecular sieve bed, thereby charging the molecular sieve with adsorbable components, terminating charging of the molecular sieve upon the breakthrough of the least easily adsorbable secondary adsorbate component prior to the breakthrough of water vapor therefrom, and regenerating the molecular sieve at a temperature of 100° – 200° C., preferably 100°–150° C., and especially about 100° C., by passing a heated purge gas through the molecular sieve bed in a direction opposite to the adsorption direction. Partial dehydration is obtained which is sufficient to lower the water dew point of a gas subsequently adsorbed on the regenerated molecular sieve to −70° C. or lower, thereby enabling the thusly treated gas to be subjected to low temperature fractionation. The use of these relatively low temperatures for molecular sieve regeneration results in substantial energy savings without impairing the effectiveness of the molecular sieve in gas adsorption.

An apparatus suitable for use in the above process permits continuous gas adsorption and molecular sieve regeneration includes alternatingly reversible adsorption reactors having a purge gas heating unit disposed therebetween which reduces full cycle times to from 1 to 2 hours.

13 Claims, 5 Drawing Figures

PROCESS AND APPARATUS FOR THE ADSORPTIVE PURIFICATION OF GASES

BACKGROUND OF THE INVENTION

1. Field of the Invention

This invention relates to a process and apparatus for the adsorptive purification of gases. More particularly, this invention relates to a process and apparatus for the adsorptive removal of water and one or more secondary components, particularly carbon dioxide, from gases containing these substances, by charging zeolite molecular sieves which are subsequently regenerated at an elevated temperature by passing a purge gas therethrough.

2. Description of the Prior Art

Adsorbents are widely used for the purification or separation of gaseous mixtures, particularly adsorbents which, depending on their characteristics and operating conditions, are capable of preferentially or selectively adsorbing individual components from such gaseous mixtures.

Whereas in earlier times activated carbon and silica gel were the two most important such adsorbents, the so-called molecular sieves, particularly the zeolites, have gained increasingly wide acceptance as adsorbents in recent years. Although molecular sieves are currently more expensive than either activated carbon or silica gel, they exhibit extraordinarily sharp selectivity with respect to components with which they are brought into contact, and thus are preferred in many instances in spite of their higher initial cost.

While all three of the aforementioned adsorbents are regenerable, i.e., they can be freed of the absorbed components in a suitable manner and thus be restored to the original chargeable condition, the regeneration of molecular sieves requires far stricter conditions than the regeneration of either silica gel or activated carbon. The relatively high adsorption heats and high adsorption capacities at elevated temperatures which are characteristic of molecular sieve adsorption require higher temperatures for desorption as compared to other adsorbents.

Nonetheless, molecular sieves, especially the zeolites, are far superior to silica gel for drying gases, especially gases having low initial water vapor partial pressures, since the water adsorption capacity of the zeolites remains practically constant over a wide range, even in cases of decreasing water vapor partial pressures. Since molecular sieves are additionally capable of adsorbing secondary gas components, including carbon dioxide, ammonia, hydrogen sulfide, acetylene, and nitrous oxide, down to extraordinarily small residual levels in the thus-purified gas, the zeolite molecular sieves are ideally suited for drying and purification of gases which are to be subsequently further separated in a low-temperature fractionation process. Such gases include not only air, but also, for example, crude hydrogen. Prior to low-temperature fractionation, such gases must be almost quantitatively freed of higher-boiling impurities, such as the above-mentioned secondary gas components, since such impurities will freeze out within the apparatus at low temperatures and in time will clog same.

In order to obtain the very low dew points for the above-mentioned high-boiling impurities which are required for low-temperature separation processes, it has been thought necessary to almost completely regenerate the molecular sieves, since the lowest concentration attainable for a given component in a gas purification process is greatly dependent on the residual amount of this component remaining on the adsorbent after prior regeneration. Therefore, the producers of such molecular sieves prescribe temperatures of 200°–300° C. for the regeneration of molecular sieves which have been employed for gas drying purposes, in order to remove a satisfactory amount of the adsorbed water from the molecular sieve; simultaneously, a purge gas must be used to remove the water vapor driven out by heating.

However, a considerable heat input is required to reach such temperatures, if the preceding adsorption was conducted at about 5°–50° C. After the thus-effected regeneration, cooling of the adsorbent to the adsorption temperature again requires large amounts of energy since it is not possible in all cases to utilize the transferred heat in a useful manner at some other place. Thus, a saving in energy at this point would represent a considerable increase in the economy of running the operation. However, this did not seem readily possible to accomplish, in view of the regenerating temperatures required by the manufacturers.

German Pat. No. 871,886 describes processes for the regeneration of laden adsorbents, directed in part to saving purge gas and in part to saving heating energy. However, the teachings in this patent are directed only to activated carbon and silica gel adsorbents rather than to molecular sieves. Consequently, the data set forth in this patent are not pertinent with respect to the molecular sieves employed in the present invention.

Another aspect of economical operation of such gas adsorption and regeneration times lies in the length of time required to complete a full operating cycle.

While a process is known from German Published Application 1,259,844 (U.S. Pat. No. 2,944,627) wherein very short cycle times are employed, this process effects desorption at a temperature essentially identical to that of the adsorption. Thus, in this process, it is unnecessary to bring the adsorbent to a higher temperature for the purpose of desorption. It will be apparent that the heating procedure for desorption requires a period of time which cannot simply be on the order of seconds or a few minutes in view of the dimensions of industrial adsorption plants. Additionally, this prior art process does not permit the attainment of water dew points in the gas being dried which are as low as those required for a subsequent low-temperature separation process. The lowest water content of the air obtainable by this prior art procedure is 1 p.p.m., which corresponds, especially under high pressures, to a dew point much too high to be suitable for subsequent liquefaction and rectifying separation of gaseous mixtures. Secondary gas components such as carbon dioxide, for example, cannot be removed from a gas such as air by means of this process to a degree sufficient for subsequent low temperature fractionation.

SUMMARY OF THE INVENTION

Accordingly, it is the general object of this invention to provide a process and apparatus for the adsorptive purification of gases using reduced amounts of molecular sieve material.

An object of this invention is to provide a process and apparatus for molecular sieve regeneration requiring reduced heat input.

One object of this invention is to provide a process and apparatus for efficiently regenerating a molecular sieve bed before it has become saturated with adsorbed water.

Another object of this invention is to provide a process and apparatus for gas purification requiring a reduced time period for a complete cycle of adsorption and regeneration.

A further object of this invention is to provide a process and apparatus for purifying gases of water and secondary components to a degree which permits subsequent low-temperature fractionation of the purified gas.

Briefly, these and other objects and advantages of the present invention are attained in one aspect by a process for the adsorptive purification of gases containing water and one or more secondary components which comprises passing the gas through a molecular sieve bed, thereby charging the molecular sieve with adsorbable components, terminating charging of the molecular sieve upon the breakthrough of the least easily adsorbable secondary gas component prior to the breakthrough of adsorbate water vapor therefrom, and then regenerating the molecular sieve at a temperature of 100° – 200 °C. by passing a purge gas through the molecular sieve in a direction opposite to the adsorption direction to desorb the molecular sieve. Following this regeneration, the zeolite molecular sieve may be used to dehydrate and purify gases to a water dew point of −70° C. or lower.

BRIEF DESCRIPTION OF THE DRAWINGS

These and other objects of this invention will become more fully apparent to those skilled in the art from the following detailed discussion of the invention, taken together with the annexed Drawings, wherein.

DETAILED DISCUSSION OF THE INVENTION

Figure 1:
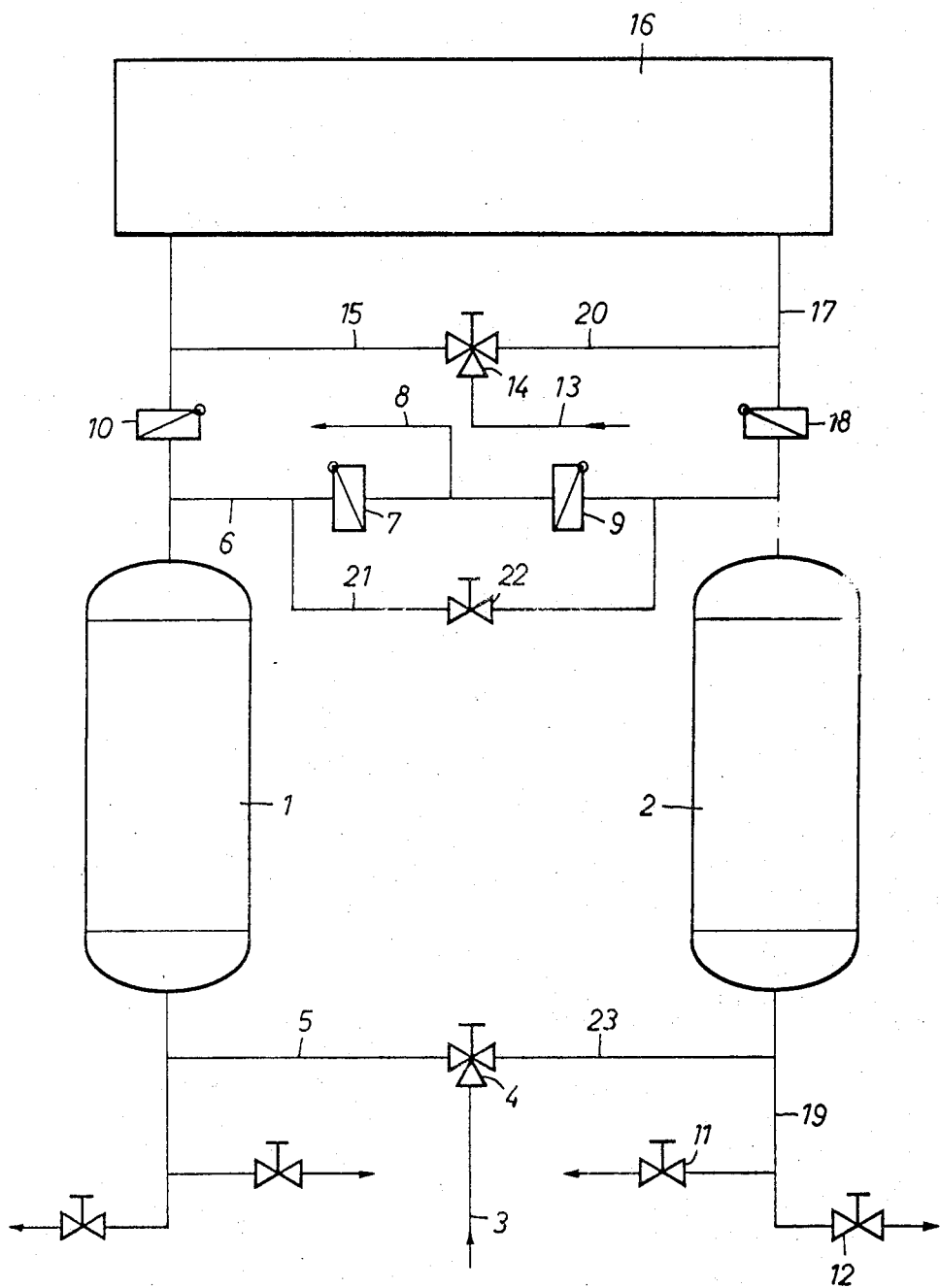
FIG. 1 is a schematic representation of a molecular sieve adsorption-desorption apparatus suitable for the process of this invention.

In accordance with this invention, zeolite molecular sieves are regenerated in a process which comprises terminating gas adsorption charging of a zeolite molecular sieve prior to the breakthrough of water vapor therefrom, preferably upon the breakthrough of secondary adsorbate components which precede water vapor breakthrough, and regenerating the molecular sieve at a temperature of 100°–200° C., preferably 100°–150° C., and especially about 100° C. by passing a heated purge gas through the molecular sieve bed in a direction opposite to the adsorption direction. Partial dehydration is obtained which is sufficient to lower the water dew point of a gas subsequently adsorbed on the regenerated zeolite to −70° C. or lower, thereby enabling the thusly treated gas to be subjected to low temperature fractionation. The use of these relatively low temperatures for zeolite regeneration results in substantial energy savings without impairing the effectiveness of the molecular sieve in gas adsorption. Additionally, this invention provides an apparatus for practicing the process herein disclosed in a continuous manner with short full cycle times.

The process of this invention can be used with any of the crystalline zeolites, either natural or synthetic. Suitable naturally occurring zeolites include but are not limited to: analcite, chabazite, natrolite, permutite, stilbite and heulandite; suitable synthetic zeolites include both type A and type X zeolites. The synthetic type X zeolites are often preferred in gas purification. Whereas gas adsorption on molecular sieve beds can be carried out at any convenient temperature below 100° C., it is generally preferable to carry out gas adsorption at temperatures between 5° and 50° C. A wide range of pressures can be employed, atmospheric or superatmospheric pressures up to about 200 atmospheres absolute being preferred.

Gases which can be purified by adsorption on zeolite molecular sieve beds by the process of this invention include but are not limited to: air, nitrogen, oxygen and hydrogen, rare gases, natural gas, coke oven gas and converter gas. Secondary components in the gas which are removed in addition to the water are materials normally in the gaseous phase at room temperature and ambient pressure, including carbon dioxide, ammonia, hydrogen sulfide, acetylene, propene, nitrous oxide, and the like. Since these secondary components are held less tenaciously than water by the zeolites due to their chemical composition and structure, it has been found useful to monitor the degree of adsorbent bed water saturation by noting the breakthrough of a secondary component, preferably the least easily adsorbable component at this point, water has not yet fully penetrated the zeolite bed to the outlet and a bed layer at the outlet end is still free from water. This bed condition is advantageous, since counterflow regeneration will thus not form a large amount of steam near the outlet end which would prevent the attainment of water dew points in subsequently purified gas which are sufficiently low, i.e., −70° C. or less, for subsequent low temperature fractionation purposes.

In the process of this invention, gas adsorption is interrupted at a point in time when only such quantities of the aforementioned impurities are present in the gas exiting from the adsorber which do not interfere during a subsequent low-temperature separation of a gas. For example, contents of 0.2 p.p.m. $H_2O$ and 0.5 p.p.m. $CO_2$ will not exert any interference in the subsequent separation of air by liquefaction and rectification. The process of the present invention makes it actually possible to reduce the water content to 0.1 p.p.m. and the contents of secondary components which may be present, such as carbon dioxide, ammonia, hydrogen sulfide, acetylene or nitrous oxide, to 0.2 p.p.m.

Molecular sieve regeneration according to this invention permits a substantial savings of energy as compared to prior art processes. This is achieved, according to the invention, by terminating the charging of the molecular sieve prior to the breakthrough of the thus-adsorbed components, and then regenerating the molecular sieve at a temperature of below 200° C. to such an extent that, in the gas to be purified, a water dew point is reached of −70° C. or therebelow.

Therefore, in the process of this invention, in a deliberate deviation from the requirements of the molecular sieve manufacturers, the regeneration is conducted at lower temperatures; in this connection, residual charges attained on the molecular sieve are surprisingly so minor that a water dew point of −70° C., sufficient for the purposes of the subsequent rectifying gas separation, is readily obtained.

As previously indicated, a layer of molecular sieve disposed at the terminal end of the adsorber with reference to the flow direction of the gas to be purified, remains uncharged. In order not to contaminate this last layer of adsorbent, desorption of the desorbate according to this invention is conducted by introducing a purge gas in a direction opposite to the adsorption direction. Suitable purge gases are well known in the art, i.e., nitrogen, and are characterized by a very how water dew point, e.g., −80° to −100 °C, and a very low content of secondary components. The purge gas content of secondary components should be lower than the breakthrough amounts of the secondary components being measured as an indication of bed saturation, e.g., less than 0.1 p.p.m. It is additionally advantageous to effect the desorption by means of a dry purge gas, i.e., one having a water content of less than 0.05 − 0.1 p.p.m., in order to avoid loading of this last layer with water due to any moisture contained in the purge gas. The procedure of passing the dry purge gas, previously heated to the regenerating temperature, through the arrangement, is continued until the residual water load remaining on the molecular sieve is so minor that, upon the subsequent switching to adsorption, the required dew point is attained in the gas to be purified.

The point at which regeneration of the zeolite molecular sieve bed is sufficiently complete to allow use of the bed in another gas adsorption can be determined by measuring the outlet temperature of the purge gas according to conditions that may optionally be taken from the curves given in FIGS. 2–5. In spite of using relatively low temperature purge gases for regeneration, this is accomplished in the process of the invention within a surprisingly short period of time, so that operating times of 1 to 2 hours can be reached in which a full cycle of adsorption, regeneration, and recooling to the adsorption temperature takes place.

These brief operating times are greatly preferred over the long operating periods of the prior art, e.g., 8 hours. Substantially less molecular sieve is required with shorter running times because complete regeneration of the molecular sieve with respect to water is intentionally omitted. In other words, a residual water load is left on the molecular sieve which, though relatively large according to prior art standards, ensures a capacity of the molecular sieve sufficient for the renewed reception of water and one or more secondary components for the required purpose, and which, in conjunction with the last, uncharged layer of the molecular sieve, makes it possible to obtain the desired low water dew points in the purified gas.

The water dew point of a gas, in addition to being influenced by the absolute water content, also depends on the pressure to which the gas is subjected, as shown in the following table:

TABLE

| Water Content 0.1 p.p.m. | | Water Content 0.2 p.p.m. | |
| --- | --- | --- | --- |
| Gas Pressure | Dew Point | Gas Pressure | Dew Point |
| 100 atm. abs. | −70.5° C. | 100 atm. abs. | −65.0° C. |
| 50 atm. abs. | −72.5° C. | 50 atm. abs. | −67.5° C. |
| 10 atm. abs. | −78.0° C. | 10 atm. abs. | −73.5° C. |

In order to conduct the process of this invention, a novel adsorption plant has been developed wherein the heating unit for the regenerating gas is disposed horizontally between two alternatingly reversible adsorption units. This arrangement has the advantage that the conduits leading from the heating device to the two adsorption units can be designed to be extremely short and thus heat losses can be kept at a minimum. By "extremely short" is meant a length of 40 cm from the top edge of the adsorber to the bottom edge of the heating device in a plant suitable for treating 500 Nm³/h of gas.

The invention will now be described hereinbelow with reference to a schematically illustrated adsorption plant and several examples for the simultaneous removal of water and carbon dioxide from air, but it is to be understood that these are preferred embodiments and not limitative of the generic aspects of the invention.

In the embodiments set forth below, wherein water and carbon dioxide in air were adsorbed together, carbon dioxide was measured as the breakthrough component, rather than the water, at the outlet of the respective adsorption unit. This was done because carbon dioxide, as a heavy adsorbable component, breaks through long before the water, the latter being tenaciously retained by molecular sieves owing to their chemical composition and structure. The same also holds true for other secondary components, such as ammonia, hydrogen sulfide, acetylene, or nitrous oxide, which are likewise in the gaseous phase at room temperature.

Referring to FIG. 1, an adsorption plant according to this invention is illustrated. Reference numerals 1 and 2 denote two alternatingly operated adsorption units. The gas to be freed from water and carbon dioxide enters the plant at 3. The gas then passes, via valve 4 and conduit 5, into the adsorption unit 1 and leaves the latter, after having been freed of these substances down to a residual content of 0.1 p.p.m. of $H_2O$ and 0.2 p.p.m. of $CO_2$, via conduit 6, check valve 7, and conduit 8. Check valves 9 and 10 are retained in the closed position during this time by the pressure of the gas to be purified.

While the adsorption unit 1 is adsorbing, the adsorption unit 2 is being regenerated. For this purpose, the valve 11 at the lower end of the adsorption unit 2 is first opened and the pressure in adsorption unit 2 is lowered. When the regenerating pressure has been reached, valve 11 is closed, valve 12 is opened, and a dry and $CO_2$-free regenerating gas is fed to the plant via conduit 13. This regenerating gas passes through the distributor valve 14 and conduit 15 into the heating device 16; during the regeneration of the adsorption unit 2, the regenerating gas flows through this heater from the left toward the right and passes therefrom, via conduit 17 and check valve 18 which opens due to the pressure of the regenerating gas, into adsorption unit 2. This adsorption unit is brought to an elevated temperature by the heated regenerating gas, whereby the previously adsorbed components are removed from the adsorbent. The adsorbate-laden regenerating gas leaves the adsorption unit 2 via conduit 19 and valve 12. After the heating step is finished, valve 14 is switched over, so that the regenerating gas fed through conduit 13 can enter, circumventing the heating unit 16, directly through conduit 20 and check valve 18 into the adsorption unit 2 to cool the latter. After the cooling step is terminated, valve 12 is closed and the adsorption unit 2 is brought to operating pressure via the bypass 21 with the valve 22, with the aid of product gas from adsorption unit 1, whereupon the gas to be purified can flow, by switching over the valve 4, through conduit 23 into the thus-regenerated adsorption unit 2. Adsorption unit 1 can now be regenerated in the manner described with respect to adsorption unit 2 by actuating the corresponding valves.

The invention will furthermore be explained with reference to two numerical examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Adsorption units 1 and 2 were filled with a zeolite molecular sieve, type X. Air to be freed of $H_2O$ and $CO_2$ was fed via line 3 under a pressure of 29 atmospheres absolute, at a rate of about 530 $Nm^3/h$. Adsorption took place at ambient temperature of 21°–24° C. The pressure buildup and reduction took place for 3.5 minutes, and the heating time during the regeneration was 15 minutes. Regeneration was effected by the introduction of 110 $Nm^3/h$. of dry nitrogen through conduit 13, which nitrogen was first heated in heating unit 16 to temperatures ranging between 80° and 300° C. The total operating time of a full adsorption unit cycle, including pressure buildup, adsorption, pressure reduction, regeneration, and cooling, was approximately 0.8 hour for a regenerating gas temperature of about 80° C., and approximately 1.1 hours for a regenerating gas temperature of 300° C. The changeover from the adsorption phase to the regenerating phase was made before a $CO_2$ analyzer connected downstream of the adsorption unit indicated an exit gas content of 0.2 p.p.m. $CO_2$. The water content of the exiting gas was 0.1 p.p.m. at this time. Simultaneously, the energy consumed during regeneration and recooling was determined. The results of the experiments on which this example is based are graphically illustrated in FIGS. 2 and 3.

Figure 2:
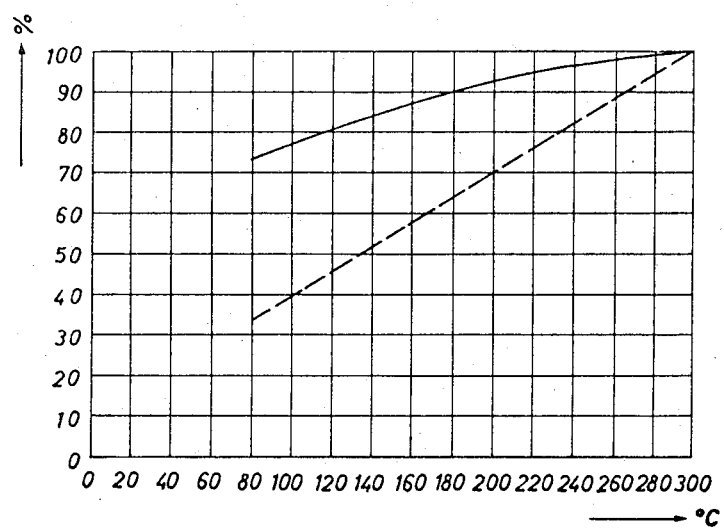
FIG. 2 and FIG. 4 graphically indicate the relationship between the inlet temperature of a regenerating gas along the abscissa and the percent reduction in energy consumption with decreasing regenerating gas inlet temperatures along the ordinate.

Referring to FIG. 2, the abscissa indicates the inlet temperature of the regenerating gas, and the ordinate indicates the percent reduction of the breakthrough charge of the zeolite molecular sieve of type X plotted for carbon dioxide (solid curve) and that of the energy consumption (dashed curve) with decreasing regenerating gas inlet temperature. In this connection, the breakthrough charge and the energy consumption were defined to be 100 percent at an inlet temperature of the regenerating gas of 300° C. As can be seen from the curves, the breakthrough charge decreases only by about 27 percent in the range of 300° to 100° C. regenerating temperature, whereas simultaneously the energy consumption is reduced by 60 percent.

Figure 3:
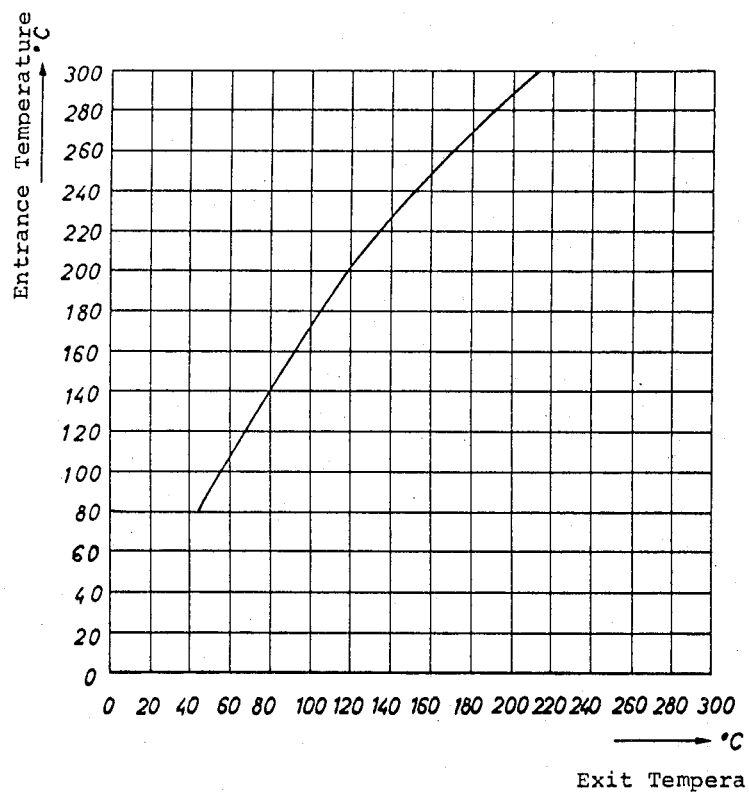
FIG. 3 and FIG. 5 graphically indicate the relationship between the regenerating gas inlet temperature on the ordinate and the regenerating gas outlet temperature along the abscissa.

In FIG. 3, the curve indicates the dependency of the temperature of the regenerating gas outlet (abscissa) at the end of the adsorption unit on the temperature of the regenerating gas inlet (ordinate). Thus, in the experiments, the entire adsorbent was not heated to the predetermined regeneration temperature; rather, hot regenerating gas was conducted through the adsorbent only for a time required for producing the low dew points of $H_2O$ and $CO_2$ in the subsequently purified gas which is required for further low-temperature separation.

In summary, it can be seen from FIGS. 2 and 3 that a regenerating gas inlet temperature of only 200° C. results in a breakthrough charge which is practically equal to that which could be obtained with a regeneration at 300° C., and that, even with an inlet temperature of the regenerating gas of only 100° C., it is still possible to attain breakthrough charges which are economically quite feasible, using an energy requirement far lower than could ordinarily be predicted.

EXAMPLE 2

The experimental conditions in this example differed from those of Example 1 in that the adsorption temperature was 8.5° C. to 11.5° C., and in that the regenerating temperatures were varied between 80° and 260° C.; the total operating time of an adsorption unit at the regenerating temperature of 80° C. as in Example 1 was about 1.2 hours, and at a regenerating temperature of 260° C. about 1.7 hours.

Figure 4:
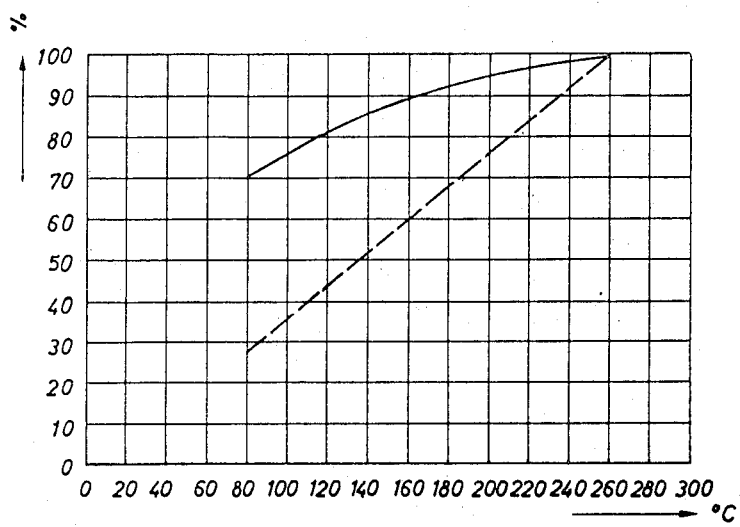
Figure 5:
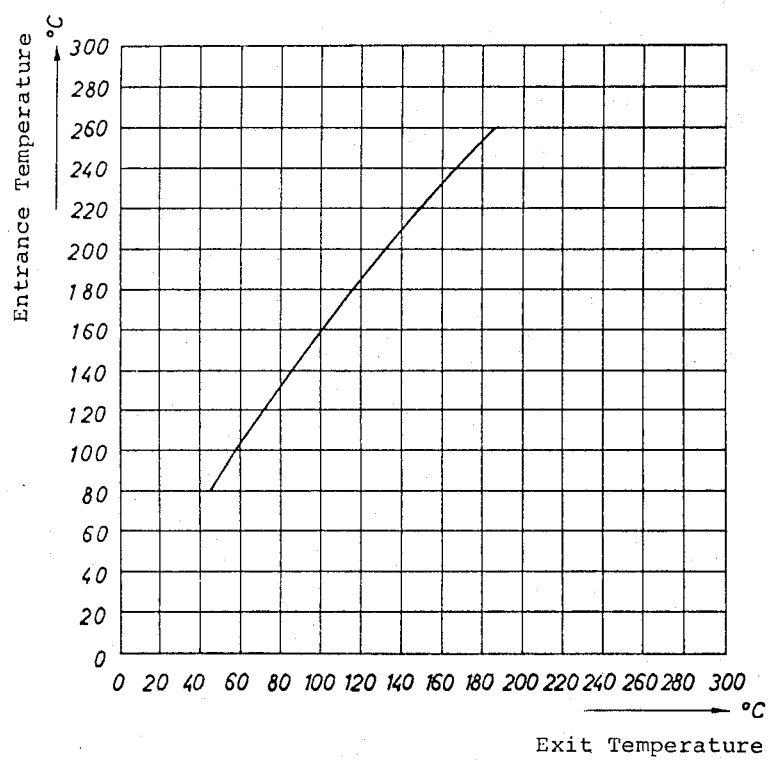

The results of the experiments on which this example is based are represented in FIGS. 4 and 5 in a manner analogous to FIGS. 2 and 3. In contrast to the illustration in FIG. 2, the 100 percent breakthrough charge in FIG. 4 is defined as one resulting at a regeneration of 260° C.

In FIG. 5, as in FIG. 3, the dependency of the outlet temperature of the regenerating gas (abscissa) on the inlet temperature of the regenerating gas (ordinate) is illustrated. It can also be seen that an inlet temperature of the regenerating gas of 200° C. yields very good results, and a regenerating gas inlet temperature of 100° C. still leads to economically feasible breakthrough charges, whereas the energy consumption is again significantly lower than would correspond to the relatively minor reduction in breakthrough charge.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the adsorptive purification of gases containing water and one or more secondary components selected from the group consisting of carbon dioxide, ammonia, hydrogen sulfide, acetylene, propene and nitrous oxide, which comprises:
   a. passing the gas-to-be-purified through a zeolite molecular sieve bed, thereby charging the molecular sieve with adsorbable components;
   b. terminating said charging upon the breakthrough of the least easily adsorbable secondary component; and
   c. regenerating said molecular sieve at a temperature of 100° – 150°C. by passing a heated purge gas through said bed in a direction opposite to the adsorption direction, thereby desorbing and only partially dehydrating said bed, and subsequently passing additional amounts of the gas-to-be-purified through the bed until the gas-to-be-purified is dehydrated to a water dew point of −70°C. or lower, wherein a full adsorption unit cycle of pressure buildup, pressure reduction, heating, regeneration and cooling is completed in about 1 to 2 hours.

2. The process of claim 1 wherein said least easily adsorbable secondary gas component is carbon dioxide.

3. The process of claim 1 wherein said molecular sieve is regenerated at a temperature of about 100 °C.

4. The process of claim 1 wherein said molecular sieve is a type X zeolite.

5. The process of claim 1 wherein said charging is conducted at a temperature of between 5° and 50 °C.

6. The process of claim 1, further including low temperature fractionation of said gas purified by adsorption.

7. The process of claim 1 conducted in a continuous manner with a plurality of alternatingly reversible adsorption units, wherein at least one of said units is regenerated while at least a different one of said units is adsorbing, and said charging is terminated by switching a gas adsorbate feed to a regenerated unit.

8. The process of claim 1 wherein said purge gas is dry nitrogen.

9. The process of claim 2 wherein said molecular sieve is regenerated at a temperature of about 100° C.

10. A process for the adsorptive purification of air containing water and one or more secondary components selected from the group consisting of carbon dioxide, ammonia, hydrogen sulfide, acetylene, propene and nitrous oxide, which comprises:
   a. passing the air through a zeolite molecular sieve bed, thereby charging the molecular sieve with adsorbable components;
   b. terminating said charging when resultant exit air has a water content of 0.1 ppm and a carbon dioxide content of 0.2 ppm; and
   c. regenerating said molecular sieve at a temperature of about 100° − 150° C. by passing a heated purge gas through said bed in a direction opposite to the adsorption direction, thereby desorbing and only partially dehydrating said bed, whereby said bed is sufficiently regenerated to dehydrate a gas subsequently passed therethrough to a water dew point of −70°C. or lower, and wherein a full adsorption unit cycle of pressure buildup, pressure reduction, heating, regeneration and cooling is completed in about 1 to 2 hours.

11. The process of claim 10 wherein said molecular sieve is regenerated at a temperature of about 100° C.

12. A process as defined by claim 10, wherein said charging is conducted at a temperature of between 5° and 50° C.

13. A process for the adsorptive purification of gases containing water and one or more secondary components selected from the group consisting of carbon dioxide, ammonia, hydrogen sulfide, acetylene, propene and nitrous oxide, which comprises:
   a. passing the gas through a zeolite molecular sieve bed, thereby charging the molecular sieve with adsorbable components;
   b. terminating said charging upon the breakthrough of carbon dioxide; and
   c. regenerating said molecular sieve at a temperature of about 100° − 150° C. by passing a heated purge gas through said bed in a direction opposite to the adsorption direction, thereby desorbing and only partially dehydrating said bed, and subsequently passing additional amounts of the gas to be purified through the bed until the gas is dehydrated to a water dew point of −70°C. or lower.

* * * * *